(12) United States Patent
Hanzawa et al.

(10) Patent No.: US 7,121,722 B2
(45) Date of Patent: Oct. 17, 2006

(54) TEMPERATURE SENSOR

(75) Inventors: Go Hanzawa, Aichi (JP); Masahiko Nishi, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 41 days.

(21) Appl. No.: 10/835,473

(22) Filed: Apr. 30, 2004

(65) Prior Publication Data
US 2004/0218662 A1    Nov. 4, 2004

(30) Foreign Application Priority Data
May 2, 2003    (JP)    ............... P.2003-127448

(51) Int. Cl.
*G01K 13/00*    (2006.01)
*G01K 7/16*    (2006.01)

(52) U.S. Cl. ............... 374/185; 374/148; 374/208

(58) Field of Classification Search ............... 374/185, 374/148, 138, 144, 178–179, 183, 208; 338/22 SD
See application file for complete search history.

(56) References Cited

U.S. PATENT DOCUMENTS

| | | | |
|---|---|---|---|
| 5,181,007 A * | 1/1993 | Friese et al. ............... 338/22 R |
| 5,430,428 A * | 7/1995 | Gerblinger et al. ............ 338/25 |
| 5,735,606 A * | 4/1998 | Tani et al. ................. 374/185 |
| 5,743,646 A * | 4/1998 | O'Connell et al. ......... 374/148 |
| 5,823,680 A * | 10/1998 | Kato et al. ................. 374/185 |
| 6,297,723 B1 * | 10/2001 | Shoji et al. ................. 338/28 |
| 6,305,841 B1 * | 10/2001 | Fukaya et al. ............... 374/185 |
| 6,341,892 B1 * | 1/2002 | Schmermund ............... 374/185 |
| 6,466,123 B1 * | 10/2002 | Kuzuoka et al. .............. 338/25 |
| 6,501,366 B1 * | 12/2002 | Takahashi et al. ............ 338/25 |
| 6,639,505 B1 * | 10/2003 | Murata et al. ................ 338/25 |
| 6,698,922 B1 * | 3/2004 | Adachi et al. ............... 374/208 |
| 6,762,671 B1 * | 7/2004 | Nelson ........................ 338/25 |
| 6,899,457 B1 * | 5/2005 | Kurano ........................ 374/185 |
| 2003/0091093 A1* | 5/2003 | Zitzmann et al. ........... 374/185 |

FOREIGN PATENT DOCUMENTS

| | | | |
|---|---|---|---|
| GB | 2178606 A | * | 2/1987 |
| JP | 04276530 A | * | 10/1992 |
| JP | 2001056256 A | * | 2/2001 |
| JP | 2002-168701 A | | 6/2002 |

* cited by examiner

*Primary Examiner*—Yaritza Guadalupe-McCall
(74) *Attorney, Agent, or Firm*—Sughrue Mion, PLLC

(57) ABSTRACT

A temperature sensor comprising: a flange having a bore and mounted on a fluid pipe having a fluid flow, to prevent said fluid from leaking out; an MI cable formed to have metallic cores insulated and retained on a metallic outer cylinder, and fixed in such a mode in said bore that a leading end side of said MI cable protrudes from a leading end side of said flange and extends in an axial direction; a metallic cap fixed on a leading end side outer circumference of said MI cable and having fluid communication ports for allowing said fluid to flow therein; and a temperature sensing element including: a ceramic substrate housed in said cap; a sensing portion formed over said ceramic substrate and having electric characteristics varied with a temperature of said fluid; and a wiring portion for connecting said sensing portion and said metallic cores of said MI cable electrically.

15 Claims, 8 Drawing Sheets

TEMPERATURE SENSOR

FIELD OF THE INVENTION

The present invention relates to a temperature sensor. The temperature sensor of the invention is used suitably for the case, in which a temperature sensing element is arranged in a fluid pipe to have a fluid (e.g., an exhaust gas) flow such as the inside of a catalytic converter or an exhaust pipe of an exhaust gas cleaning system of an automobile, thereby to detect the temperature of the fluid.

BACKGROUND OF THE INVENTION

In the prior art, there has been known a temperature sensor, as called the "exhaust temperature sensor", which is disposed in the exhaust pipe of the vehicle and used for detecting the temperature of the exhaust gas. Moreover, a known temperature sensor of this kind has a structure, in which a ceramic substrate having a metallic resist or made of a material of a platinum-group is mounted as a temperature sensing portion (as referred to JP-A-2002-168701).

A detailed construction of the temperature sensor is shown in FIG. 7. A ceramic substrate 81 is fixed by a holding member 90 in a cylindrical case 80 made of a metal. The ceramic substrate 81 is formed into a slender plate shape having wiring layers 81*a* applied on its one face, as shown in FIG. 8. A metallic resistor 82 made of a thermistor material of a platinum group or the like is printed on the leading end side of the ceramic substrate 81. On the trailing end side of the ceramic substrate 81, there are fixed terminals 83, which are electrically connected with the metallic resistor 82 through the wiring layers 81*a*. The terminals 83 of the ceramic substrate 81 are connected with the cores 92 of an Mineral Insulated ("MI") cable 91 extending through a spacer 93 from the case 80, as shown in FIG. 7. At a position of a length L1 from the leading end of the case 80, on the other hand, there is formed a flange portion 80*a*, around which a nut 94 is turnably mounted. On the leading end side of this flange portion 80*a*, there is formed a seal surface 80*c*, which makes close contact with the mounting seat face of the exhaust pipe thereby to prevent the exhaust gas from leaking out. In the leading end side of the case 80, moreover, there are formed a plurality of fluid communication ports 80*b* for providing the communication of the exhaust gas with the inside of the case 80. Here, the MI cable 91 is called the "sheath core", too, and is provided with the cores 92 inside of a cylindrical outer cylinder made of a metal. This outer cylinder is insulated and filled with ceramics or the like so that the cores 92 are held while being insulated from the outer cylinder.

In this temperature sensor, the metallic resistor 82 outputs a resistance varying with the temperature of the exhaust gas, as an electric signal, which is extracted to the outside of the case 80 by the cores 92 of the MI cable 91. Thus, the temperature of the exhaust gas is measured by the temperature sensor so that the engine or the like of the vehicle is properly controlled according to the measured temperature.

SUMMARY OF THE INVENTION

In case the fluid pipe such as the exhaust pipe having the fluid flow has different diameters or in case the fluid temperature is detected at different positions in the fluid pipe, however, it is difficult to change a length (or a leg length) L1 from the leading end of the temperature sensor to the seal surface 80*c* for the fluid pipe. More specifically, in case the axial length L1 of that portion of the temperature sensor which is exposed to the inside of the fluid pipe has to be changed according to the demand of a user, it is necessary either to change the length of the ceramic substrate 81 while changing the length of the case 80 or to change the length of the MI cable 91. This may make it necessary to prepare cases 80 or ceramic substrates 81 of different lengths at all times. This preparation may not only cause troubles but also raise the manufacture cost. If the change is made to enlarge the length of the ceramic substrate 81, moreover, this ceramic substrate 81 has an axially slender shape and may lower its vibration-proofing properties.

The present invention has been conceived in view of the background of the prior art thus far described and has an object to provide a temperature sensor capable of easily changing the axial length (or the leg length) of its portion be exposed to a fluid pipe having a fluid flow, to lower its manufacture cost and to retain the vibration-proofing properties of a ceramic substrate.

According to the invention, there is provided a temperature sensor comprising:

a flange having a bore and mounted on a fluid pipe having a fluid flow, to prevent the fluid from leaking out;

an MI cable formed to have metallic cores insulated and retained on a metallic outer cylinder, and fixed in such a mode in the bore that its own leading end side protrudes from the leading end side of the flange and extends in the axial direction;

a metallic cap fixed on the leading end side outer circumference of the MI cable and having fluid communication ports for allowing the fluid to flow therein; and a temperature sensing element including: a ceramic substrate housed in the cap; a sensing portion formed over the ceramic substrate and having electric characteristics varied with the temperature of the fluid; and a wiring portion for connecting the sensing portion and the metallic cores of the MI cable electrically.

In the temperature sensor of the invention, the cap is directly fixed on the leading end side outer circumference of the MI cable, which is fixed in such a mode in the bore as to protrude from the leading end side of the flange, and the temperature sensing element having the sensing portion on the ceramic substrate housed in the cap is electrically connected with the metallic cores of the MI cable. In case the axial length (or the leg length) of that portion of the temperature sensor, which is to be exposed to the inside of the fluid pipe having the fluid flow, has to be changed, therefore, it is sufficient to cut the MI cable (i.e., the outer cylinder of the MI cable) to a necessary length thereby to change the length of the MI cable protruding from the leading end side of the flange. In this temperature sensor, moreover, the axial length of the ceramic substrate need not be changed to cause no trouble in the vibration-proofing problem, which accompanies the change in the axial length of the ceramic substrate.

According to the temperature sensor of the invention, therefore, the change in the axial length (or the leg length) of that portion of the temperature sensor, which is to be exposed to the inside of the fluid pipe, can be easily made merely by adjusting the axial length of the MI cable, thereby to lower the manufacture cost. On the other hand, this temperature sensor is designed to need no change in the axial length of the ceramic substrate for the change in the leg length, so that the vibration-proofing properties of the ceramic substrate can also be retained when the temperature sensor is to be used. In this temperature sensor, moreover, the cap for arranging the temperature sensing element has the fluid communication port formed for allowing the fluid to flow into the cap. It is, therefore, possible to realize a highly precise temperature detection, which is excellent in the responsibility of the temperature sensing element (or the temperature sensing portion) to the change in the fluid temperature.

Here, the temperature sensing portion to construct the temperature sensing element is not especially limited, if its electric characteristics change depending on the temperature of the fluid (e.g., the exhaust gas). However, it is preferred from the viewpoint of the high temperature dependency of the electric resistance and from the chemical stability and the excellent heat resistance that the temperature sensing portion is made of a metallic resistor composed mainly of platinum. This metallic resistor composed mainly of platinum can be formed over the ceramic substrate by either a thick film method such as a screen printing method or a thin film method such as a sputtering or a vapor deposition. Considering the miniaturization of a pattern or the manufacturing dispersion of the pattern, it is preferred to form the metallic resistor in a thin film over the ceramic substrate.

In the temperature sensor of the invention, moreover, it is preferred that the ceramic substrate has a smaller width perpendicular to the axial direction thereof, as seen along the planar direction of the face to have the sensing portion, than the external diameter of the outer cylinder of the MI cable. As a result, the cap to be fixed on the leading end side outer circumference of the MI cable can be reduced in size (or in diameter) so that the temperature sensor itself can be small-sized. In the temperature sensor of the invention, moreover, the cap for housing the temperature sensing element can be diametrically reduced to improve the responsibility of the temperature detection.

In the temperature sensor of the invention, moreover, it is preferred that the ceramic substrate has a ratio W/L3 of the width W perpendicular to the axial direction thereof, as seen along the planar direction of the face to have the sensing portion, to the axial length L3 thereof is 0.2 to 4, and that both the length L3 and the width W are at most 10 mm. With the ratio W/L3 thus being 0.2 to 4, it is possible to make the vibration-proofing properties of the ceramic substrate stabler. With the length L3 and the width W being at most 10 mm, moreover, the heat capacity of the ceramic substrate can be reduced to improve the responsibility of the temperature detection. Here, it is preferred that the ceramic substrate has a smaller thickness of 5 mm or less than the values L3 and W.

In the temperature sensor of the invention, moreover, the ceramic substrate may be so housed in the cap that its own rear end is on the more rear side than the trailing end of a fluid communication port formed in the side wall of the cap, and a shielding portion for preventing the fluid from invading a region on the more rear side than the trailing end of the ceramic substrate may be disposed in the cap between the trailing end of the fluid communication port formed in the side wall of the cap and the leading end face of the outer cylinder of the MI cable.

Here in case the wiring portions of the temperature sensing portion and the metallic cores of the MI cable are connected in the cap, the conductive path including the metallic cores of the MI cable is exposed to the internal region (or space) between the trailing end face of the ceramic substrate composing the temperature sensing element and the leading end face of the outer cylinder of the MI cable. If the fluid communication port is formed in the cap housing the temperature sensing element is formed to improve the responsibility of the temperature sensing element, therefore, the exposed conductive path is directly exposed to the fluid introduced from the fluid communication port into the cap. On the other hand, the fluid such as the exhaust gas coming from the internal combustion engine may contain a foreign substance such as moisture or soot. As a result, the foreign substance may pass through the fluid communication port and stick to the exposed conductive path thereby to invite a trouble such as a short-circuiting in the conductive path.

According to the temperature sensor of the invention, on the contrary, the shielding portion is provided for shielding the invasion of the fluid from the trailing end of the ceramic substrate into the rear side region. As a result, the fluid is not exposed to the conductive path including the metallic cores of the MI cable positioned on the more rear side in the cap than the ceramic substrate, so that the foreign substance in the fluid can be prevented from sticking to the conductive path. Even in case the fluid communication port is formed in the cap, therefore, the short-circuiting trouble of the conductive path can be prevented to provide a temperature sensor, which is excellent in the electric reliability while improving the responsibility. Here, it is preferred that the shielding portion is made of an insulating heat-resisting material such as mainly of glass.

In the temperature sensor of the invention, moreover, it is preferred that a vibration-proofing portion for retaining at least the metallic cores of the MI cable is disposed in the space between the leading end face of the outer cylinder of the MI cable and the trailing end face of the ceramic substrate. By providing that vibration-proofing portion, the metallic cores of the MI cable can be stably held in the cap so that the metallic cores of the MI cable can be reliably prevented from being broken at the using time of the temperature sensor.

DESCRIPTION OF REFERENCE NUMERALS AND SIGNS

100, 300 - - - TEMPERATURE SENSOR
7 - - - FLANGE
7a - - - BORE
7b - - - SEAL SURFACE
3 - - - MI CABLE
3a - - - OUTER CYLINDER
4 - - - METALLIC CORES (CORES)
1, 400 - - - CAP
401 - - - LEADING END SIDE CAP
402 - - - TRAILING END SIDE CAP 1a, 1b, 401a, 401b - - - FLUID COMMUNICATION PORT
20, 200 - - - TEMPERATURE SENSING ELEMENT
2, 22 - - - CERAMIC SUBSTRATE
2a, 22a - - - SENSING PORTION (METALLIC RESISTOR)
2b, 2c, 22b - - - WIRING PORTION
(2b - - - ELECTRODE WIRE, 2c - - - WIRING LAYER)
5 - - - VIBRATION-PREVENTING PORTION
6 - - - SHIELDING PORTION
11 - - - HOUSING
13 - - - LEAD WIRES

DETAILED DESCRIPTION OF THE INVENTION

Embodiments 1 and 2 of the invention will be described with reference to the accompanying drawings.

[Embodiment 1]

Figure 1:
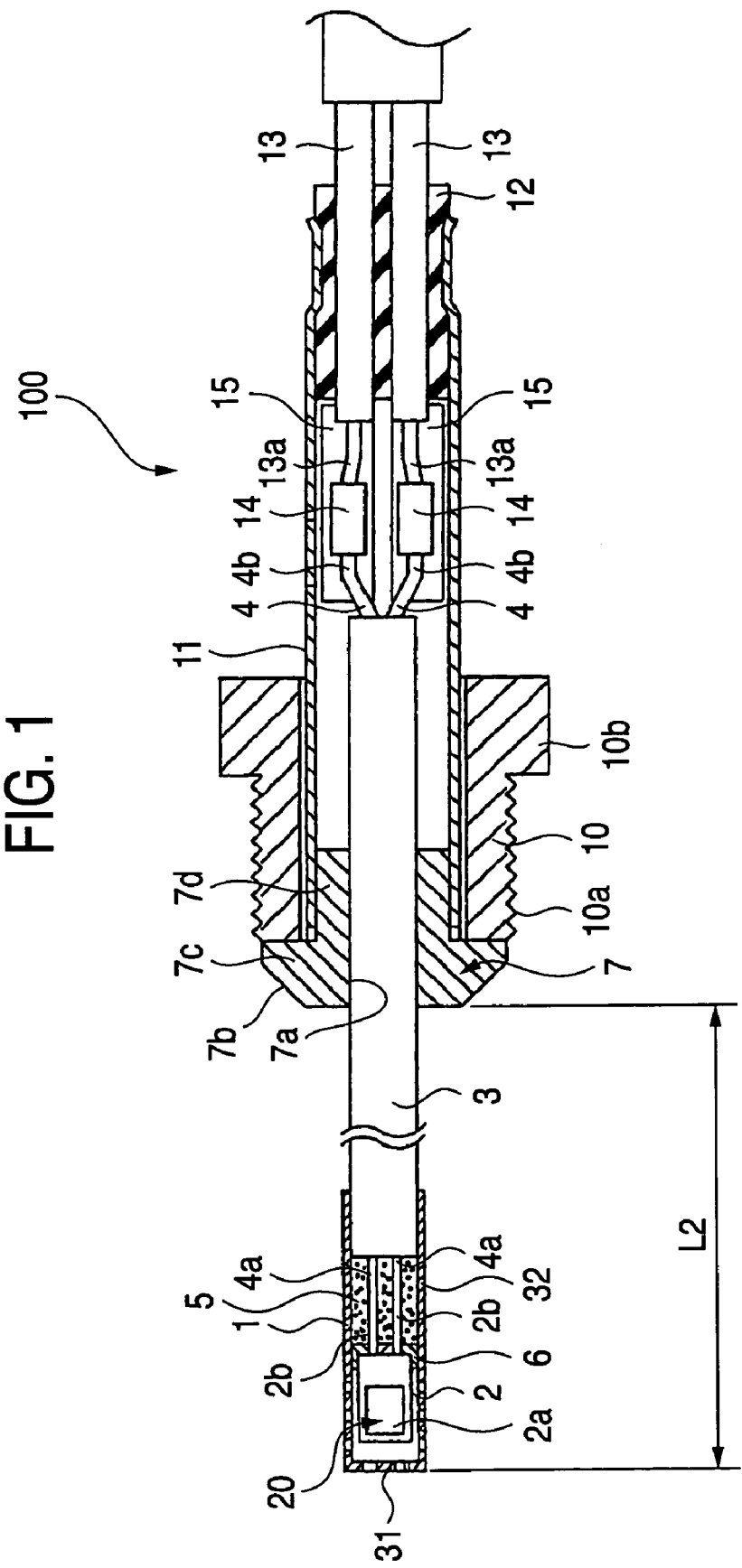
FIG. 1 is a sectional view of a temperature sensor of Embodiment 1.

A temperature sensor 100 of Embodiment 1 is constructed, as shown in FIG. 1, to include a flange 7, an MI cable 3, a cap 1, and a temperature sensing element 20 having a temperature sensing portion 2a formed over a ceramic substrate 2.

More specifically, the flange 7 of SUS310S is fixed on the leading end side of a cylindrical housing 11 made of SUS304 and is mounted on a vehicular exhaust pipe to have an exhaust gas flow by a nut 10, which is to be turned on the outer circumference of the housing 11. This nut 10 has an external thread 10a and a hexagonal nut portion 10b, so that the flange 7 is mounted on the mounting portion of the exhaust pipe by fastening the external thread 10a on the internal thread of the mounting portion of the not-shown exhaust pipe. As a result, the temperature sensor 100 is fixed as a whole to the exhaust pipe. Moreover, the flange 7 is composed of: a sheath portion 7d having a bore 7a and extending in the axial direction; and a bulging portion 7c positioned on the leading end side of the sheath portion 7d and bulging radially outward. The bulging portion 7c is formed into an annular shape having such a tapered seal surface 7b on its leading end side as mates with a countertapered mounting face of the mounting portion of the not-shown exhaust pipe. When the nut 10 is mounted on the mounting portion of the exhaust pipe, the seal surface 7b comes into mating engagement with the mounting seat surface of the mounting portion to prevent the exhaust gas from leaking to the outside. On the other hand, the sheath portion 7d is inserted into the housing 11 and is fixed gas-tight in the housing 11 by a laser welding-all-around.

The MI cable 3 is fixed in the bore 7a of the flange 7 and extended from the leading end side and the trailing end side of the flange 7. Here, the MI cable 3 is formed in such a mode that a pair of cores (or metallic cores) 4 made of SUS310S are insulated and retained through insulating powder (i.e., $SiO_2$ powder in this embodiment) in an outer cylinder 3a made of SUS310S. The bottomed cylindrical cap 1 made of SUS310S is fixed on the outer circumference of the leading end side of that MI cable 3 by a laser welding-all-around. The axial length from the leading end of the cap 1 to the leading end edge of the seal surface 7b of the flange 7 (that is, the axial length of such a portion of the temperature sensor 100 as to be exposed to the inside of the exhaust pipe) is set at L2 (mm).

Here, the MI cable 3 is fixed in the bore 7a of the flange 7 by laser welding-all-around it to the sheath portion 7d of the flange 7. In the cap 1, a plurality of fluid communication ports 1a are formed in a bottom wall 31 introducing a fluid to be measured into the cap 1, and a plurality of fluid communication ports 1b having a similar function are formed in a side wall 32. The temperature sensing element 20 is housed in the leading end portion of the cap 1.

Figure 3:
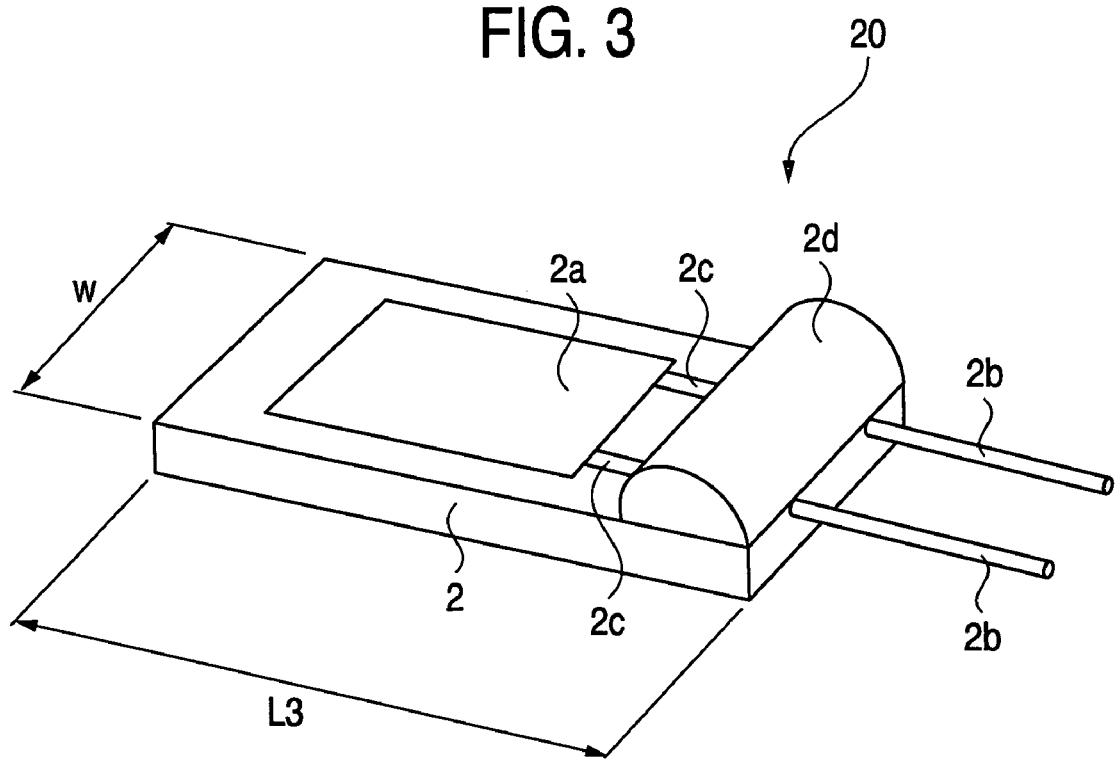
FIG. 3 is a perspective view of a ceramic substrate according to the temperature sensor of Embodiment 1.

The ceramic substrate 2 of alumina composing the temperature sensing element 20 is sized such that a width W perpendicular to the axial direction, as seen along the planar direction of the face to have the later-described metallic resistor 2a, is smaller than the external diameter W1 of the outer cylinder 3a of the MI cable 3 (that is, W=2 mm and W1=2.5 mm in this embodiment). The exterior view of the temperature sensing element 20 is shown in FIG. 3. In the ceramic substrate 2 in the temperature sensing element 20, the ratio W/L3 of the width W perpendicular to the axial direction to the length L3 in the axial direction is ⅔ (that is, W=2 mm and L3=3 mm in this embodiment). Here, the ceramic substrate 2 has a thickness set to a smaller value (e.g., 0.5 mm in this embodiment) than those of the aforementioned values L3 and W.

On one face of the ceramic substrate 2, moreover, there is formed the metallic resistor 2a, which is made mainly of Pt having a resistance varying with the temperature of the exhaust gas. Here, this metallic resistor 2a is formed into a thin film having a predetermined pattern shape (e.g., a meandering pattern in this embodiment, although not shown) and is coated with a protective film (although not shown) of glass or the like. On that face of the ceramic substrate 2, there are formed two wiring layers 2c, which are connected with the metallic resistor 2a. Moreover, a pair of electric wires 2b are jointed one-by-one to the wiring layers 2c, and the connected portions (or the overlapping portions) between the wiring layers 2c and the electric wires 2b are coated with a protective film 2d made of glass or the like. As a result, the resistance of the metallic resistor 2a varying with the temperature is outputted as an electric signal to the electric wires 2b through the wiring layers 2c. In this embodiment, the electric wires 2b and the wiring layers 2c correspond to a wiring portion in the Claims, and the metallic resistor 2a correspond to a sensing portion.

Figure 2:
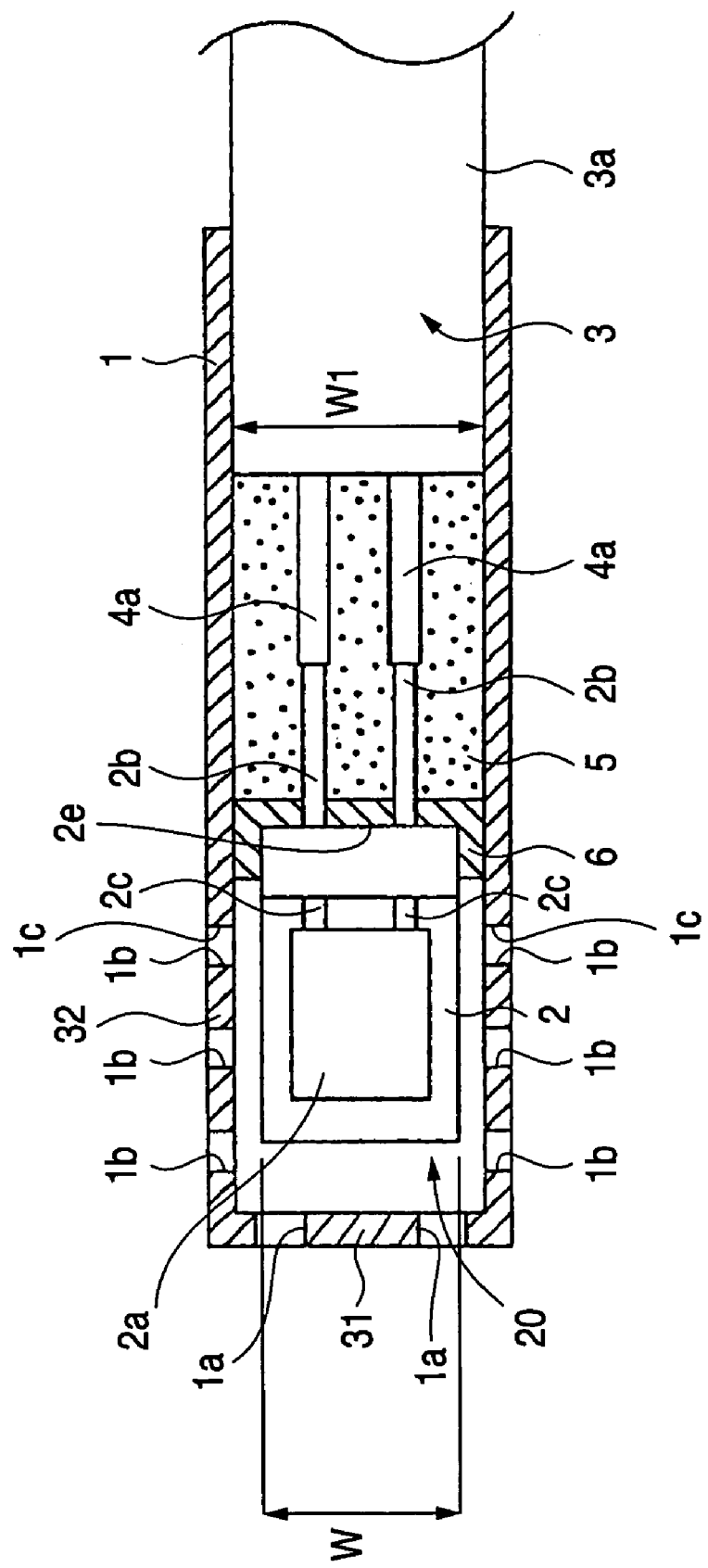
FIG. 2 is an enlarged sectional view of a portion of the temperature sensor of Embodiment 1.

As shown in FIG. 2, the metallic resistor 2a and the paired cores 4 of the MI cable 3 are electrically connected by welding the paired electric wires 2b of the temperature sensing element 20 to ends 4a of the cores 4 of the MI cable 3. At this time, the temperature sensing element 20 is so housed in the cap 1 that the trailing end (or the trailing end face) 2e of its ceramic substrate 2 is positioned on the more rear side than the trailing end 1c of that of the fluid communication ports 1 formed in the side wall 31 of the cap 1, which is positioned on the most trailing end side.

In the cap 1 and between the leading end face of the outer cylinder 3a of the MI cable 3 and the trailing end face 2e of the ceramic substrate 2, moreover, there are disposed a vibration-proofing portion 5 made of insulating cement and a shielding portion 6 made of crystallized glass (e.g., borosilicate glass) and positioned on the leading end side of the vibration-proofing portion 5 and on the more rear side than the trailing end 1c of that of the fluid communication ports 1b formed in the side wall 31 of the cap 1, which is positioned on the most trailing end side. Moreover, the vibration-proofing portion 5 stably holds the cores 4 of the MI cable 3 arranged in the cap 1 and the connected portions between the cores 4 of the MI cable 3 and the electric wires 2b of the temperature sensing element 20. Here in this embodiment, the cement forming a body portion 6a is composed of an aggregate made mainly of alumina and a glass component.

By forming the shielding portion 6 in the cap 1, moreover, the inside region of the cap 1 is defined across the shielding portion 6 into the front side and the rear side. Even in case the fluid communication ports 1a and 1b are formed in the cap 1, therefore, the exhaust gas introduced into the cap 1 is blocked by the shielding portion 6 from invading the region on the more rear side than the trailing end 2e of the ceramic substrate 2. As a result, a foreign substance such as a moisture content contained in the exhaust gas can be effectively prevented from sticking to the conductive paths, which are composed of the electric wires 2b and the cores 4 and positioned on the rear side of the ceramic substrate 2.

Moreover, the vibration-proofing portion 5 of cement and the shielding portion 6 of crystallized glass can be formed in the cap 1 in the following manner. First of all, the electric wires 2b of the temperature sensing element 20 and the cores 4a of the MI cable 3 are welded to each other. After this, the cap 1 having the fluid communication ports 1a and 1b formed in advance are so fixed by a laser welding-all-around to the outer cylinder 3a of the MI cable 3 as to cover the temperature sensing element 20. After this, a predetermined amount of unsolidified cement is poured into the fluid communication ports 1a formed in the bottom wall 31 of the cap 1, and is dried and solidified to form the vibration-proofing portion 5. Subsequently, a predetermined amount of glass powder is poured into the same fluid communication ports 1a and is subjected to a heat treatment to form the shielding portion 6.

As shown in FIG. 1, the other ends 4b of the MI cable 3 are fixed on connecting terminals 14 in the housing 11. Moreover, one-side ends 13a of a pair of lead wires 13 are fixed on the connecting terminals 14. The other ends 4b of the cores 4 and the one-side ends 13a of the lead wires 13 are covered with insulating tubes 15 together with the connecting terminals 14. Moreover, a grommet 12 made of heat-resisting rubber is caulked in the trailing end side of the housing 11. The paired lead wires 13 are extended through the grommet 12 from the trailing end side of the housing 11.

In the temperature sensor 100 of Embodiment 1 thus constructed, the cap 1 is directly fixed on the outer circumference of the leading end side of the MI cable 3, which is so fixed in the bore 7a of the flange 7 that it is protruded from the leading end side of the flange 7, and the temperature sensing element 20 having the metallic resistor 2a on the ceramic substrate 2 housed in that cap 1 is electrically connected with the cores 4 of the MI cable 3. In case the axial length (or the leg length) L2 of that portion of the temperature sensor 100, which is to be exposed to the inside of the fluid pipe (or the exhaust pipe) to have the fluid (or the exhaust gas) flow, is to be changed, therefore, the MI cable 3 (i.e., the outer cylinder 3a of the MI cable 3) may be cut to a necessary length thereby to change the its length protruded from the leading end side of the flange 7. In this temperature sensor 100, moreover, the axial length of the ceramic substrate 2 need not be changed to cause none of the vibration-proofing trouble, which might otherwise accompany the change in the axial length of the ceramic substrate 2.

In this temperature sensor 100, moreover, the ceramic substrate 2 is sized such that the width W perpendicular to the axial direction, as seen along the planar direction of the face to have the metallic resistor 2a, is smaller than the external diameter W1 of the outer cylinder 3a of the MI cable 3. Therefore, the cap 1 fixed on the outer circumference of the leading end side of the MI cable 3 can be reduced in size (i.e., in diameter) so that the temperature sensor 100 itself can be small-sized. In this temperature sensor 100, moreover, the cap 1 housing the temperature sensing element 20 can be diametrically reduced to improve the responsibility of the temperature detection.

In this temperature sensor 100, moreover, the ratio W/L3 of the width W of the ceramic substrate 2 in the temperature sensing element 20, as taken perpendicularly of the axial direction, to the length L3 in the axial direction is ⅔ (that is, W=2 mm and L3=3 mm in this embodiment), and the thickness of the ceramic substrate 2 set to a smaller value (e.g., 0.5 mm in this embodiment) than those of the aforementioned values L3 and W. By thus setting the aforementioned ratio W/L3 within a range of 0.2 to 4, the vibration-proofing properties of the ceramic substrate 2 can be made stabler. By setting the length L3 and the width W at 10 mm or less and the thickness of the ceramic substrate 2 smaller than the values L3 and W, moreover, the heat capacity of the ceramic substrate 2 can be reduced to improve the responsibility of the temperature detection.

According to the temperature sensor 100 of Embodiment 1, therefore, the axial length (or the leg length) L2 of that portion of the temperature sensor 100, which is to be exposed to the inside of the fluid pipe (or the exhaust pipe), can be easily changed by adjusting the axial length of the MI cable 3, so that the manufacture cost can be lowered. Moreover, this temperature sensor 100 is designed to need no change in the axial length of the ceramic substrate 2 for changing the leg length L2, so that the vibration-proofing properties of the ceramic substrate 2 can be retained when the temperature sensor 100 is used.

[Embodiment 2]

Figure 4:
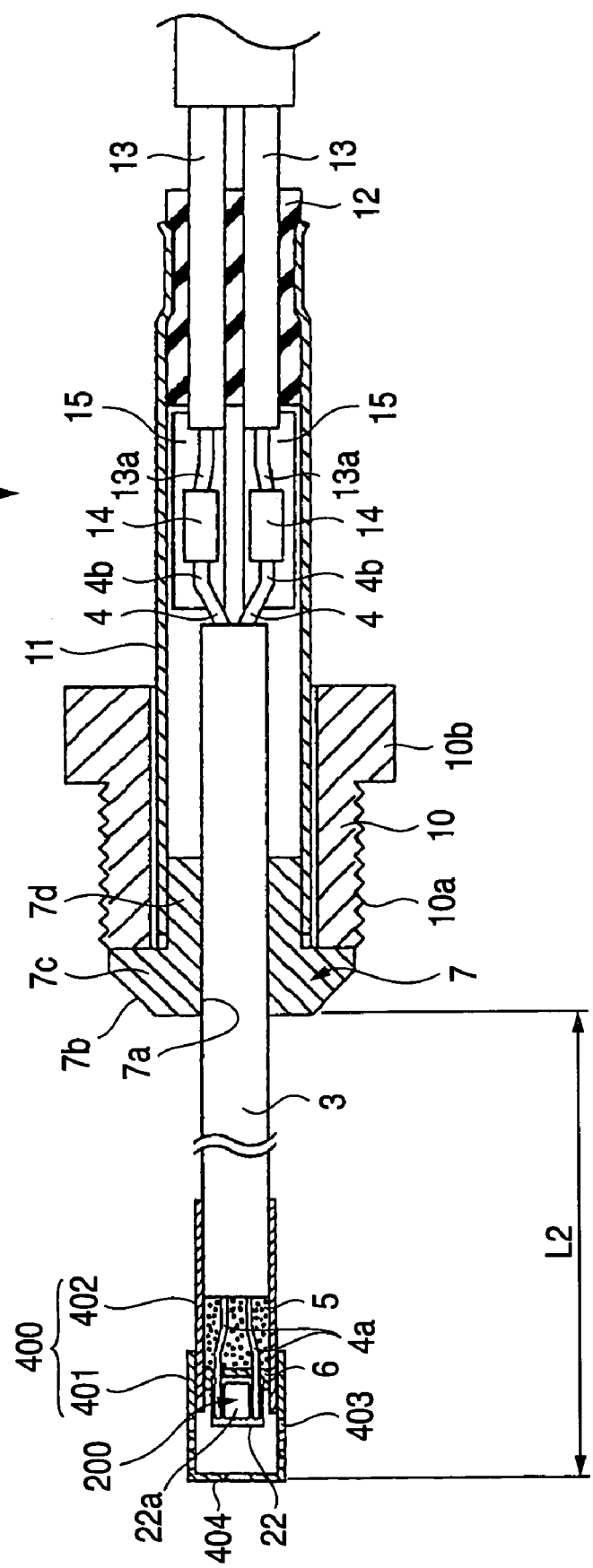
FIG. 4 is a sectional view of a temperature sensor of Embodiment 2.

As shown in FIG. 4, a temperature sensor 300 of Embodiment 2 has a construction similar to that of temperature sensor 100 shown in FIG. 1, excepting that a temperature sensing element 200 is different from that of the temperature sensor 100 of Embodiment 1. The description of the temperature sensor 300 will be omitted by designating the components identical to those of Embodiment 1 shown in FIG. 1.

Figure 6:
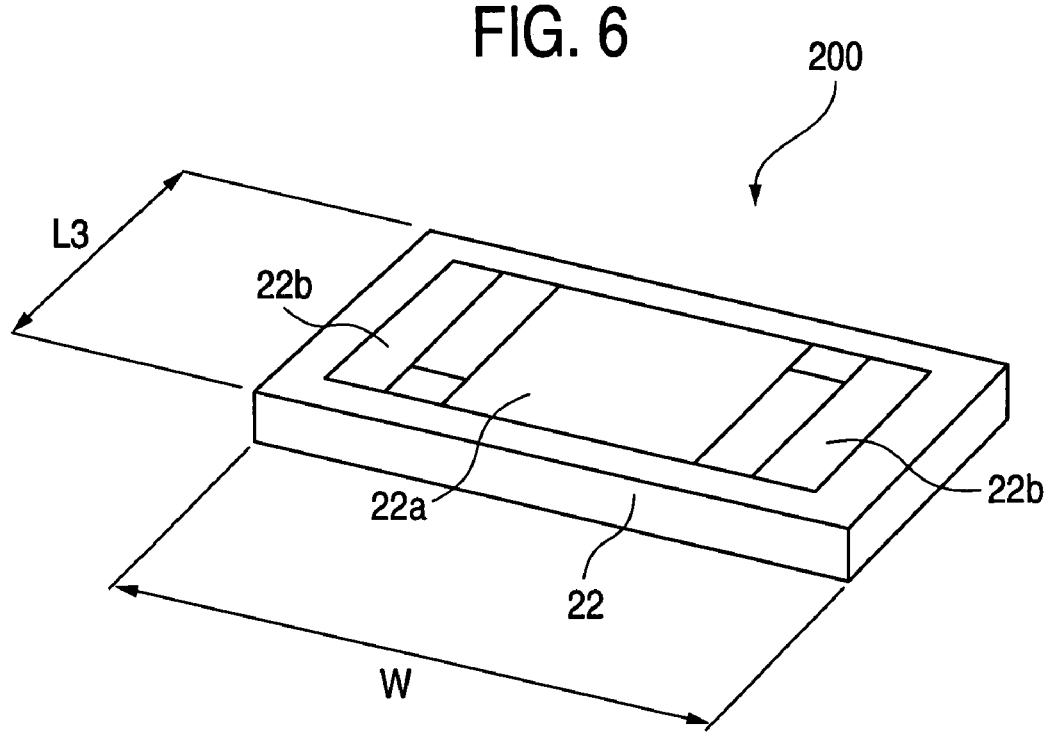
FIG. 6 is a perspective view of a ceramic substrate according to the temperature sensor of Embodiment 2.
Figure 7:
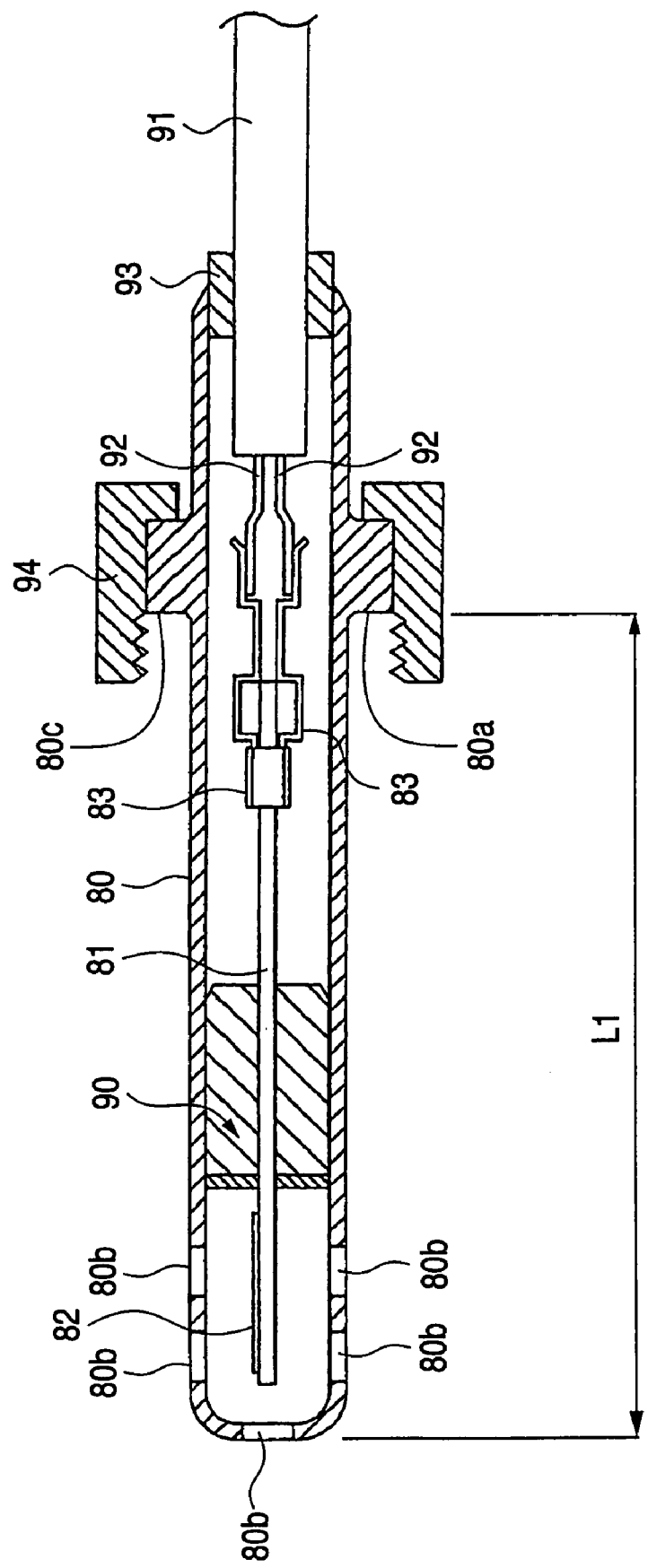
FIG. 7 is a sectional view of a temperature sensor of the related art.
Figure 8:
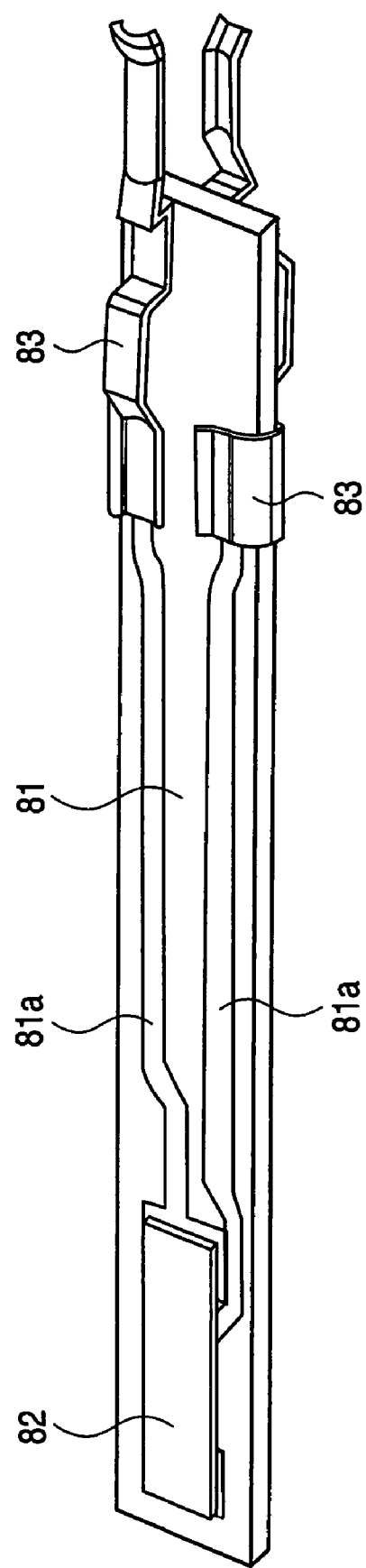
FIG. 8 is a perspective view of a ceramic substrate according to the temperature sensor of the related art.

The exterior view of the temperature sensing element 200 to be used in the temperature sensor 300 of Embodiment 2 is shown in FIG. 6. The ratio W/L3 of the width W perpendicular to the axial direction, as seen along the planar direction of the face to have a metallic resistor 22a, to the axial length L3 of a ceramic substrate 22 composing the temperature sensing element 200 is 2 (that is, W=3.2 mm and L3=1.6 mm in this embodiment). Here, the ceramic substrate 22 is made of alumina and has a thickness set to a smaller value (as specified by 0.5 mm) than those of the aforementioned values L3 and W.

At the center of the ceramic substrate 22, moreover, there is formed the metallic resistor 22a, which is made mainly of Pt having a resistance varying with the temperature of the exhaust gas. On the ceramic substrate 2 and close to the two end portions, there are formed two film-shaped wiring portions 22b, which are connected with the metallic resistor 22a. Those two wiring portions 22b are individually jointed and connected with the paired cores 4 of the MI cable 3. As a result, the resistance of the metallic resistor 22a varying with the temperature is outputted as an electric signal to the cores 4 of the MI cable 3 through the wiring portions 22b. Here, the metallic resistor 22a and the connected portions between the wiring portions 22b and the cores 4 are coated with the (not-shown) protective film made of glass or the like. In Embodiment 2, the outer cylinder 3a of the MI cable 3 has an external diameter of 3.3 mm.

Figure 5:
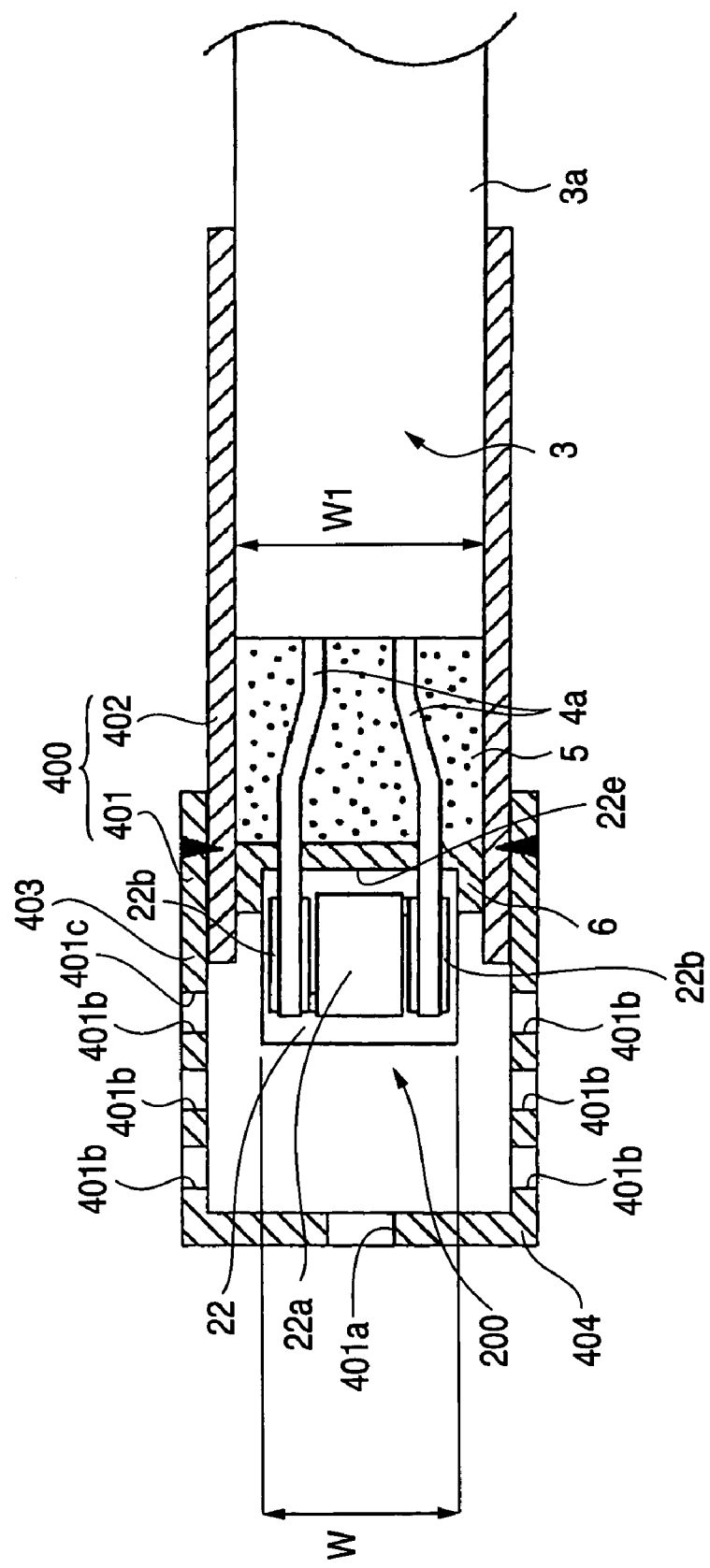
FIG. 5 is an enlarged sectional view of a portion of the temperature sensor of Embodiment 2.

In the temperature sensor 300 of Embodiment 2, as shown in FIG. 5, the cylindrical cap 400 is formed of a double structure, which is constructed of a bottomed cylindrical leading end side cap 401 and a trailing end side cap 402 having two open ends. More specifically, the trailing end side cap 402 is fixed on the outer side of the outer cylinder 3a of the MI cable 3 by the laser welding-all-around, and the leading end side cap 401 is fixed on the outer side of the trailing end side cap 402 by the laser welding-all-around. In the leading end side cap 401, a plurality of fluid communication ports 401b are formed in a side wall 403, and one fluid communication port 401a is formed in a bottom wall 404. Here, no fluid communication port is formed in the trailing end side cap 402.

Moreover, the temperature sensing element 200 is housed in that cap 400 having the double structure. More specifically, the temperature sensing element 200 is so housed in the cap 400 that the trailing end (or trailing end face) 22e of the ceramic substrate 22 constructing the temperature sensing element 200 is positioned on the more rear side than the trailing end 401c of that of the fluid communication ports 401b formed in the side wall 403 of the leading end side cap 401, which is positioned on the most trailing end side.

For the temperature sensor 300 of Embodiment 2, moreover, in the cap 400 and between the leading end face of the outer cylinder 3a of the MI cable 3 and the trailing end face 22e of the ceramic substrate 22, moreover, there are disposed the vibration-proofing portion 5 made of insulating cement and the shielding portion 6 made of crystallized glass and positioned on the leading end side of the vibration-proofing portion 5 and on the more rear side than the trailing end 401c of that of the fluid communication ports 401b formed in the side wall 403 of the leading end side cap 401, which is positioned on the most trailing end side. Moreover, the vibration-proofing portion 5 stably holds the cores 4 of the MI cable 3 arranged in the cap 400.

By forming the shielding portion 6 in the cap 400, moreover, the inside region of the cap 1 is defined across the shielding portion 6 into the front side and the rear side. Even in case the fluid communication ports 401a and 401b are formed in the cap 400 (i.e., the leading end side cap 401), therefore, the exhaust gas introduced into the cap 1 is blocked by the shielding portion 6 from invading the region on the more rear side than the trailing end 22e of the ceramic substrate 22. As a result, a foreign substance such as a moisture content contained in the exhaust gas can be effectively prevented from sticking through the fluid communication ports 401a and 401b to the conductive paths, which are composed of the cores 4 positioned on the rear side of the ceramic substrate 22.

In the temperature sensor 300 of Embodiment 2, moreover, the vibration-proofing portion 5 of cement and the shielding portion 6 of crystallized glass can be formed in the cap 400 in the following manner. First of all, the electric wires 22b of the temperature sensing element 200 and the cores 4a of the MI cable 3 are jointed to each other. These connected portions are coated with a protective film, and the trailing end side cap 402 is then fixed by laser welding-all-around it to the outer cylinder 3a of the MI cable 3. After this, a predetermined amount of unsolidified cement is poured from the leading end side opening of the trailing end side cap 402, and is dried and solidified to form the vibration-proofing portion 5. Subsequently, a predetermined amount of glass powder is poured from the same leading end side opening and is subjected to a heat treatment to form the shielding portion 6. The leading end side cap 401 having the fluid communication ports 401a and 401b formed in advance is so fixed on the trailing end side cap 402 by the laser welding-all-around method as to cover the temperature sensing element 200.

This temperature sensor 300 can also achieve actions and effects similar to those of Embodiment 1. By the temperature sensor 300 of Embodiment 2, too, the axial length (or the leg length) L2 of that portion of the temperature sensor 300, which is to be exposed to the inside of the fluid pipe (or the exhaust pipe), can be easily changed by adjusting the axial length of the MI cable 3, so that the manufacture cost can be lowered. Moreover, this temperature sensor 300 is designed to need no change in the axial length of the ceramic substrate 22 for changing the leg length L2, so that the vibration-proofing properties of the ceramic substrate 22 can be retained.

The invention has been described hereinbefore in connection with Embodiments 1 and 2. However, the invention should not be limited to those embodiments but could naturally be suitably modified without departing from the gist thereof. For example, the vibration-proofing portion 5 should not be limited to one made of cement but can be made of ceramic fibers (e.g., fibers composed mainly of alumina and $SiO_2$).

In Embodiments 1 and 2, moreover, the vibration-proofing portion 5 may be omitted, and the shielding portion 6 may also be formed in such a mode that it fills up the whole region on the rear side of the trailing ends 2e and 22e of the ceramic substrates 2 and 22. On the other hand, the temperature sensors 100 and 300 of Embodiments 1 and 2 may be applied not only to the exhaust temperature sensor but also to temperature sensors for measuring the intake temperature of the engine and the temperatures of the air inside and outside of a room.

This application is based on Japanese Patent application JP 2003-127448, filed May 2, 2003, the entire contents of which are hereby incorporated by reference, the same as if set forth at length.

What is claimed is:

1. A temperature sensor comprising:
a flange having a bore and mounted on a fluid pipe having a fluid flow, to prevent said fluid from leaking out;
a cable formed to have metallic cores retained inside a metallic outer cylinder and insulated from each other and the metallic outer cylinder, and fixed in such a mode in said bore that a leading end side of said cable protrudes from a leading end side of said flange and extends in an axial direction;
a metallic cap fixed on a leading end side outer circumference of said cable and having fluid communication ports for allowing said fluid to flow therein; and
a temperature sensing element including: a ceramic substrate housed in said cap; a sensing portion formed over said ceramic substrate and having electric characteristics varied with a temperature of said fluid; and a wiring portion for connecting said sensing portion and said metallic cores of said cable electrically;
wherein said ceramic substrate is so housed in said cap that a rear end of said ceramic substrate is on a more rear side than a trailing end of said fluid communication ports formed in a side wall of said cap, and
wherein a shielding portion for preventing said fluid from invading a region on a more rear side than a trailing end of said ceramic substrate is disposed in said cap between a trailing end of said fluid communication ports formed in said side wall of said cap and a leading end face of said outer cylinder of said cable.

2. The temperature sensor according to claim 1, wherein said ceramic substrate has a smaller width perpendicular to an axial direction thereof, as seen along a planar direction of a face to have said sensing portion, than an external diameter of said outer cylinder of said cable.

3. The temperature sensor according to claim 2, wherein the shielding portion is disposed so as to cover said rear end of said ceramic substrate.

4. The temperature sensor according to claim 2, wherein said shielding portion is made mainly of glass.

5. The temperature sensor according to claim 1, wherein said ceramic substrate has a ratio W/L3 of a width W perpendicular to an axial direction thereof, as seen along a planar direction of a face to have said sensing portion, to an axial length L3 thereof; and
wherein said ratio W/L3 is in a range of 0.2 to 4, and both said length L3 and said width W are at most 10 mm.

6. The temperature sensor according to claim 2, wherein said ceramic substrate has a ratio W/L3 of a width W perpendicular to an axial direction thereof as seen along a planar direction of a face to have said sensing portion, to an axial length L3 thereof; and
wherein said ratio W/L3 is in a range of 0.2 to 4, and both said length L3 and said width W are at most 10 mm.

7. The temperature sensor according to claim 1, wherein the shielding portion is disposed so as to cover said rear end of said ceramic substrate.

8. The temperature sensor according to claim 1, wherein said shielding portion is made mainly of glass.

9. The temperature sensor according to claim 1, wherein a vibration-proofing portion for retaining at least said metallic cores of said cable is disposed in a space between a leading end face of said outer cylinder of said cable and a trailing end face of said ceramic substrate.

10. The temperature sensor according to claim 1, wherein said sensing portion of said temperature sensing element is made of a metallic resistor composed mainly of platinum.

11. The temperature sensor according to claim 1, wherein said cable is a mineral insulated cable.

12. The temperature sensor according to claim 1, wherein the ceramic substrate is entirely housed in the cap.

13. A temperature sensor comprising:
a flange having a bore and mounted on a fluid pipe having a fluid flow, to prevent said fluid from leaking out;
a cable formed to have metallic cores retained inside a metallic outer cylinder and insulated from each other and the metallic outer cylinder, and fixed in such a mode in said bore that a leading end side of said cable protrudes from a leading end side of said flange and extends in an axial direction;
a metallic cap fixed on a leading end side outer circumference of said cable and having fluid communication ports for allowing said fluid to flow therein; and
a temperature sensing element including: a ceramic substrate housed in said cap; a sensing portion formed over said ceramic substrate and having electric characteristics varied with a temperature of said fluid; and a wiring portion for connecting said sensing portion and said metallic cores of said cable electrically;
wherein said ceramic substrate has a ratio W/L3 of a width W perpendicular to an axial direction thereof, as seen along a planar direction of a face to have said sensing portion, to an axial length L3 thereof said ratio is in a range of 0.2 to 4, and both said length L3 and said width W are at most 10 mm.

14. The temperature sensor according to claim 1, wherein the shielding portion is arranged in the cap.

15. The temperature sensor according to claim 13, wherein the ceramic substrate is entirely housed in the cap.

* * * * *